United States Patent
Joghee

(10) Patent No.: US 6,893,494 B2
(45) Date of Patent: May 17, 2005

(54) STABLE METAL ZIRCONIUM PHOSPHATES FOR COLOR APPLICATIONS

(75) Inventor: Ravichandran Joghee, Tamil Nadu (IN)

(73) Assignee: Carborundum Universal Limited, Tamil Nadu (IN)

(*) Notice: Subject to any disclaimer, the term of this patent is extended or adjusted under 35 U.S.C. 154(b) by 55 days.

(21) Appl. No.: 10/472,457

(22) PCT Filed: Mar. 20, 2001

(86) PCT No.: PCT/IN01/00044

§ 371 (c)(1),
(2), (4) Date: Sep. 19, 2003

(87) PCT Pub. No.: WO02/074690

PCT Pub. Date: Sep. 26, 2002

(65) Prior Publication Data

US 2004/0097361 A1 May 20, 2004

(51) Int. Cl.$^7$ .............................................. C04B 35/48
(52) U.S. Cl. ........................ 106/450; 423/306; 423/311; 423/312; 423/313
(58) Field of Search ................... 106/450; 423/306, 423/311, 312, 313

(56) References Cited

U.S. PATENT DOCUMENTS 4,784,976 A * 11/1988 Aitken ........................ 501/10

FOREIGN PATENT DOCUMENTS

EP    0 306 242 A2    3/1989

OTHER PUBLICATIONS

Pet'kov, V., et al., "Synthesis and Structure of Zirconium and 3d–Transition Metal Phosphate M0.5Zr2 (PO4)3 (M=Mn, Co, Ni, Cu, Zn)", Kristallografizya, 45(1), 2000, pp. 36–40, CAPLUS Database (retrieved on Jun. 9, 2001), STN–International, Karlsruhe (DE), CA Accession No. 2000:198478.
Abstract of JP 05 059308 A, Mar. 9, 1993, *Derwent Publications, Ltd.*, Accession No. 1993–121584, retrieved on Jun. 9, 2001 (2 pages).

* cited by examiner

*Primary Examiner*—C. Melissa Koslow
*Assistant Examiner*—Shalie Manlove
(74) *Attorney, Agent, or Firm*—Ladas & Parry LLP

(57) ABSTRACT

The invention provides a stable metal zirconium phosphates having formula (I), in which X is a metal or a combination of metals selected from Co, Mn, Ni, Cu, Cd, Fe, Cr, Al, Sn, V, Zn, Sc, Na, Mg, Ca and Si; and n has a molar value in the range of 1.25 to 22. These metal zirconium phosphates are prepared by sol-gel process.

21 Claims, No Drawings

STABLE METAL ZIRCONIUM PHOSPHATES FOR COLOR APPLICATIONS

FIELD OF INVENTION

The invention relates to the stable metal zirconium phosphates for use in colour applications. The metal zirconium phosphates according to the invention are used as colorants in ceramic compositions such as inorganic pigments, glaze, frits and glass.

BACKGROUND OF THE INVENTION $NaZr_2(PO_4)_3$ have a crystal structure with three-dimensional network of $PO_4$ tetrahedra and $ZrO_6$ octahedra linked by shared oxygens. A compound having such a structure is commonly refered as an NZP compound. The sodium ions are located at the interstitial sites created by the framework, but are replaced with other ions depending on the NZP analog. The NZP structure is exceptionally flexible towards ionic substitution at various lattice sites.

It is well known that ceramic materials with NZP structure have low thermal coefficient of expansion. Materials with NZP structure are used as a refractory materials, plasma powders etc. in a variety of applications.

SUMMARY OF THE INVENTION

The invention relates to novel stable metal zirconium phosphates compounds for ceramic colour applications. The metal zirconium phosphates according to the invention have the general formula $X_nZr_2(PO_4)_3$, in which X is a metal or combination of metals selected from Na, Mg, Ca, Co, Ni, Mn, Cu, Cd, Zn, Se, Fe, Cr, Al, Si, Sn, V; and n have a value in the range of 1.25 to 22 moles (M). These metal zirconium phosphates exhibit composite colors based on the intrinsic colors of the metals when used in ceramic composition depending upon their molar concentration in the compound. By selecting the metal or combination of metals and their molar concentration in the metal zirconium phosphate it is possible to obtain a wide range of colors in the finished goods when they are used as colorants in ceramic composition.

The invention provides a stable metal zirconium phosphate for color applications having the general formula

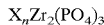

in which, X is a metal or a combination of metals selected from Na, Mg, Ca, Co, Ni, Mn, Cu, Cd, Zn, Se, Fe, Cr, Al, Si, Sn, V; and n has a molar value in the range of 1.25 to 22.

The invention also provides a method of manufacturing a stable metal zirconium phosphate for color applications having the general formula

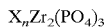

in which, X and n are as defined above, said method comprising the steps of: mixing a metal cation solution selected from one or more metal chlorides, and/or metal nitrates, in which the metal is selected from the groups consisting Na, Mg, Ca, Co, Ni, Mn, Cu, Cd, Zn, Se, Fe, Cr, Al, Si, Sn, V; with a zirconium cation solution selected from the group consisting zirconium oxychloride and zirconium nitrate to form a metal cation solution, reacting the mixture with phosphoric acid to precipitate a gel, drying the gel to obtain a powder, sintering the powder at a temperature of 800° C. to 1000° C. for 8 to 16 hours and water washing the sintered powder followed by drying to obtain the stable metal zirconium phosphate.

DETAILED DESCRIPTION OF THE INVENTION

The materials used in the synthesis of the metal zirconium phosphates according to the invention are commercial-grade chemicals. Preferably the starting materials used are water-soluble Zirconium Oxychloride, metal chlorides and phosphoric acid with 5 to 20% concentration.

The compounds of the invention are prepared using the sol-gel technique. Preferably an aqueous metal chloride having a metal concentration in the range of 1.25 to 22.0 M is dissolved in water along with zirconium oxychloride having a concentration of 0.4 to 1.0 M Zirconium. The solution is poured in a reactor and stirred to get a homogeneous mixture. Phosphoric acid with 5 to 20% concentration is added drop by drop to the solution while stirring. Addition of phosphoric acid precipitate a gel. The resulting gel is dried to remove moisture and sintered at 800° C. to 1000° C. in a kiln for 8–16 hours. The sintered powder is then water washed to remove un-reacted metal chloride and to reduce acidity and milled to get a 300–500 mesh size fine grain of powder.

The following examples illustrate the preferred metal zirconium phosphate prepared according to the invention.

EXAMPLE 1

A metal cation solution having 3 molar concentration of Na is prepared by dissolving sodium chloride in 3 liters of water. A zirconium cation solution having 1 molar concentration of Zr is prepared by dissolving zirconium oxychloride in 2 liters of water and the two solutions are mixed thoroughly to obtain a homogeneous mixture. Phosphoric acid is dissolved in 2 liters of water to obtain 1.0 molar concentration of phosphorous in the solution. This solution is added to the homogeneous mixture of metal cation solution and zirconium cation solution dropwise while stirring to obtain a gel. The gel thus obtained is dried initially at 110° C. for 2 hours and then at 150° C. for the next 2 hours to remove moisture and then sintered at a temperature of 900° C. in a kiln for 10 hours. Metal zirconium phosphate with about 3 molar concentration of Na is obtained.

EXAMPLE 2

A metal cation solution having 1.5 molar concentration of Ni is prepared by dissolving nickel chloride in 750 ml of water and zirconium cation solution having 0.5 molar concentration of Zr is prepared by dissolving zirconium oxychloride in 1 liter of water. Phosphoric acid having 0.5 molar concentration of phosphorous is prepared by dissolving phosphoric acid in 1 liter of water. Nickel zirconium phosphate was prepared by the same steps as described in example 1. Metal zirconium phosphate with about 1.5 molar concentration of Ni is obtained.

EXAMPLE 3

The process of example 2 is repeated with metal cation solution containing 3.0 molar concentration of Co prepared by dissolving cobalt chloride in 1.5 liters of water. Metal zirconium phosphate with about 3.0 molar concentration of Co is obtained.

EXAMPLE 4

The process of example 2 is repeated with metal cation solution containing 3.0 molar concentration of Zn by dissolving sodium chloride and zinc chloride in 5 liters of water. Metal zirconium phosphate obtained has about 3 molar concentration of Na and about 3 molar concentration of Zn.

EXAMPLE 5

The process of example 2 is repeated with metal cation solution containing 5 molar concentration of Cu and 0.2 molar concentration of Co by dissolving copper chloride and cobalt chloride in 2.5 liters of water. Metal zirconium phosphate obtained has about 5 molar concentration of Cu and about 0.2 molar concentration of Co.

EXAMPLE 6

The procedure of example 2 is repeated with metal cation solution containing 1.7M of Ni and 1.0M of Mn by dissolving nickel chloride and manganese chloride in 1.3 liters of water. Metal zirconium phosphate obtained has about 1.7 molar concentration of Ni and about 1.0 molar concentration of Mn.

EXAMPLE 7

The procedure of example 2 is repeated with metal cation solution containing 1.2M Ni, 0.8M Co and 0.5 Mn by dissolving nickel chloride, cobalt chloride and manganese chloride in 1250 ml of water. Metal zirconium phosphate obtained has about 1.2 mole concentration of Ni, about 0.8 molar concentration of Co and about 0.5 molar concentration of Mn.

EXAMPLE 8

The procedure of example 2 is repeated with metal cation solution containing 0.75M Ni, 0.5M Zn and 0.5M Mn by dissolving nickel chloride, zinc chloride and manganese chloride in 820 ml of water. Metal zirconium phosphate obtained has about 0.75 molar concentration of Ni, about 0.4 molar concentration of Zn and about 0.5 molar concentration of Mn.

EXAMPLE 9

The procedure of example 2 is repeated with metal cation solution containing 4.5M of Cr and 4.0M of Fe by dissolving chromium chloride and ferric chloride in 3 liters of water. Metal zirconium phosphate obtained has about 4.5 molar concentration of Cr and about 4.0 molar concentration of Fe.

EXAMPLE 10

A metal cation solution having 3.8 molar concentration of Cr, 4 molar concentration of Fe is prepared by dissolving chromium chloride and ferric chloride in 2.9 liters of water. Zirconium cation solution with 4.0 molar concentration of Zr is prepared by dissolving zirconium oxychloride in 800 ml of water. Phosphoric acid with 0.4 molar concentration of phosphorous is prepared by dissolving phosphoric acid in 500 ml of water. Metal zirconium phosphate having about 3.8 molar concentration of Cr and about 4.0 molar concentration of Fe is obtained by the same process steps as described in example 1.

EXAMPLE 11

The procedure of example 2 is repeated with metal cation solution containing 0.2M of Cr and 1.5M of Al by dissolving chromium chloride and aluminium chloride in 500 ml of water. Metal zirconium phosphate obtained has about 0.2 molar concentration of Cr and about 1.5 molar concentration of Al.

EXAMPLE 12

The procedure of example 2 is repeated with metal cation solution containing 7.4M Fe by dissolving ferric chloride in 2.5 liters of water. Metal zirconium phosphate obtained has about 7.4 molar concentration of Fe.

EXAMPLE 13

The procedure of example 2 is repeated with metal cation solution containing 3M Co and 1.5M Cr by dissolving cobalt chloride and chromium chloride in 2 liters of water. Metal zirconium phosphate obtained has about 3 molar concentration of Co and about 1.5 molar concentration of Cr.

EXAMPLE 14

The procedure of example 2 is repeated with metal cation solution containing 8.85M Cr and 0.2M Co by dissolving chromium chloride and cobalt chloride in 3.0 liters of water. Metal zirconium phosphate obtained has about 8.85 molar concentration of Cr and about 0.2 molar concentration off Co.

The procedure of example 2 is repeated with metal cation solution containing 3.4M Sn, 0.2M Cr and 1.7M of Ca by dissolving tin chloride, chromium chloride and calcium chloride in 2.2 liters of water. Metal zirconium phosphate obtained has about 3.4 molar concentration of Sn and 0.2 molar concentration of Cr and about 1.7 molar concentration of Ca.

EXAMPLE 16

The procedure of example 2 is repeated with metal cation solution having 4.0 molar concentration of Cr, 2.0molar concentration of Fe, 0.5 molar concentration of Ni, 1.0M molar concentration of Mn and 3 molar concentration of Co by dissolving ferric chloride, nickel chloride, manganese chloride and cobalt chloride in 5 liters of water. Metal zirconium phosphate obtained has about 4.0 molar concentration of Cr, about 2.0 molar concentration of Fe, about 0.5 molar concentration of Ni, about 1.0 molar concentration of Mn and about 3 molar concentration of Co.

EXAMPLE 17

The procedure of example 2 is repeated with metal cation solution containing 0.4M Co, 0.2M Cr, 0.6M of Ni and 1.2M of Fe by dissolving cobalt chloride, chromium chloride, nickel chloride and ferric chloride in 1.3 liters of water. Metal zirconium phosphate obtained has about 0.4 molar concentration of Co, about 0.2 molar concentration of Cr, about 0.6 molar concentration of Ni and about 1.2 molar concentration of Fe.

EXAMPLE 18

The procedure of example 2 is repeated with metal cation solution containing 1.2M Ni, 0.8M Co and 0.5M of Mn by dissolving nickel chloride, cobalt chloride and manganese chloride in 1.2 liters of water. Metal zirconium phosphate obtained has about 1.2 molar concentration of Ni, about 0.8 molar concentration of Co and about 0.5 molar concentration of Mn.

The metal zirconium phosphates according to the invention exhibit composite colors based on the intrinsic colours of the metals and their proportion when used a colorant in a ceramic composition. The complex molecular structures of the metal zirconium phosphorates according to the invention accommodate additional cations of the metals based on the molar concentrations in the solution used for the preparation.

Composite colors are formed when multiple metal cations are present in different proportions in the metal zirconium phosphate according to the invention.

Desired shade and intensity of the colour can be obtained when the metal zirconium phosphate according to the invention is used as colorant in a ceramic composition by choosing the water-soluble salts of metals with differing molar proportion.

Dried gel materials with different metal compositions can be sintered together in the kiln to form the corresponding metal zirconium phosphate without any contamination from other compositions.

The metal zirconium phosphate obtained are agglomerated products and can be easily milled to less than 500 mesh, sizes.

The metal zirconium phosphate according the invention can be introduced directly into the ceramic glazes aid frits. It also eliminate or reduce the opacifier requirements in the ceramic glazes and frits due to presence of zirconium content.

What is claimed is:

1. A stable metal zirconium phosphate for colour applications having the general formula $$X_n Zr_2(PO_4)_3$$

in which X is a metal or a combination of metals selected from Na, Mg, Ca, Co, Ni, Mn, Cu, Cd, Zn, Se, Fe, Cr, Al, Si, Sn, V; and n has a molar value in the range of 1.25 to 22.

2. The metal zirconium phosphate as claimed in claim 1, wherein the metal X comprises 3 moles of Na.

3. The metal zirconium phosphate as claimed in claim 1, wherein the metal X comprises 1.5 moles of Ni.

4. The metal zirconium phosphate as claimed in claim 1, wherein the metal X comprises 3 moles of Co.

5. The metal zirconium phosphate as claimed in claim 1, wherein the metal X comprises a combination of 3 moles of Na and 3 moles of Zn.

6. The metal zirconium phosphate as claimed in claim 1, wherein the metal X comprises a combination of 5 moles of Cu and 0.2 moles of Co.

7. The metal zirconium phosphate as claimed in claim 1, wherein the metal X comprises a combination of 1.7 moles of Ni and 1.0 mole of Mn.

8. The metal zirconium phosphate as claimed in claim 1, wherein the metal X comprises a combination of 1.2 moles of Ni, 0.8 moles of Co and 0.5 mole of Mn.

9. The metal zirconium phosphate as claimed in claim 1, wherein the metal X comprises a combination of 0.75 mole of Ni, 0.4 mole of Zn and 0.5 mole of Mn.

10. The metal zirconium phosphate as claimed in claim 1, wherein the metal X comprises a combination of 4.5 moles Cr and 4.0 moles of Fe.

11. The metal zirconium phosphate as claimed in claim 1, wherein the metal X comprises a combination of 0.2 mole of Cr and 1.5 moles of Al.

12. The metal zirconium phosphate as claimed in claim 1, wherein the metal X comprises 22 moles of Cr.

13. The metal zirconium phosphate as claimed in claim 1, wherein the metal X comprises 7.4 moles of Fe.

14. The metal zirconium phosphate as claimed in claim 1, wherein the metal X comprises 3 moles Co and 1.5 moles Cr.

15. The metal zirconium phosphate as claimed in claim 1, wherein the metal X comprises 8.8 moles Cr and 0.2 mole Co.

16. The metal zirconium phosphate as claimed in claim 1, wherein the metal X comprises a combination of 3.4 Sn, 0.2 mole Cr and 1.7 moles Ca.

17. The metal zirconium phosphate as claimed in claim 1, wherein the metal X comprises a combination of 4.0 moles of Cr, 2.0 mole Fe, 0.5 mole Ni, 1.0 mole Mn and 3.0 moles Co.

18. The metal zirconium phosphate as claimed in claim 1, wherein the metal X comprises a combination of 0.4 mole Co, 0.20 mole Cr, 0.6 mole Ni and 1.2 moles Fe.

19. The metal zirconium phosphate as claimed in claim 1, wherein the metal X comprises a combination of 1.2 moles Ni, 0.8 mole Co and 0.5 mole Mn.

20. A method of manufacturing a stable metal zirconium phosphate for colour applications having the general formula $$X_n Zr_2(PO_4)_3$$

in which, X and n are as defined above, said method comprising the steps of:

mixing metal cation solution selected from one or more metal chlorides and/or metal nitrates in which the metal is selected from the groups consisting Na, Mg, Ca, Co, Ni, Mn, Cu, Cd, Zn, Se, Fe, Cr, Al, Si, Sn, V; with a zirconium cation solution selected from the group consisting zirconium oxychloride and zirconium nitrate to form a metal cation solution, reacting the mixture with phosphoric acid to precipitate a gel, drying the gel to obtain a powder, sintering the powder at a temperature of 800° C. to 1000° C. for 8 to 16 hours and water washing the sintered powder followed by drying to obtain the stable metal zirconium phosphate.

21. The method as claimed in claim 19, wherein the metal cation solution is an aqueous metal chloride having a metal concentration 1.25 to 22 moles, zirconium cation solution is zirconium oxychloride with zirconium concentration of 0.4 to 1.0 mole and phosphoric acid with 5 to 20% concentration.

* * * * *